United States Patent
John et al.

(10) Patent No.: US 9,451,643 B2
(45) Date of Patent: Sep. 20, 2016

(54) SYSTEM AND METHOD FOR A MULTIPLE IP INTERFACE CONTROL PROTOCOL

(71) Applicant: FutureWei Technologies, Inc., Plano, TX (US)

(72) Inventors: Kaippallimalil Mathew John, Richardson, TX (US); Mazin Al-Shalash, Frisco, TX (US); Zhixian Xiang, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 250 days.

(21) Appl. No.: 14/027,040

(22) Filed: Sep. 13, 2013

(65) Prior Publication Data
US 2014/0078986 A1   Mar. 20, 2014

Related U.S. Application Data

(60) Provisional application No. 61/701,369, filed on Sep. 14, 2012, provisional application No. 61/709,679, filed on Oct. 4, 2012.

(51) Int. Cl.
*H04W 76/02* (2009.01)
*H04L 29/06* (2006.01)
(Continued)

(52) U.S. Cl.
CPC .......... *H04W 76/02* (2013.01); *H04L 65/1069* (2013.01); *H04W 76/022* (2013.01); *H04L 61/103* (2013.01); *H04L 61/2015* (2013.01); *H04L 61/2092* (2013.01)

(58) Field of Classification Search
CPC ........... H04W 76/022; H04W 76/025; H04W 36/22; H04W 28/12; H04W 4/24; H04W 80/04; H04W 88/06; H04W 76/02
USPC ........................ 370/328, 329, 401
See application file for complete search history.

(56) References Cited

U.S. PATENT DOCUMENTS

| 8,358,602 B2 * | 1/2013 | Puthiyandyil ....... H04W 76/025 370/310 |
| 8,467,782 B1 * | 6/2013 | Faccin ................ H04L 65/1073 370/310 |

(Continued)

FOREIGN PATENT DOCUMENTS

| CN | 101388830 A | 3/2009 |
| CN | 101547142 A | 9/2009 |

(Continued)

OTHER PUBLICATIONS

Cheshire, S., et al., "Dynamic Configuration of IPv4 link-local Addresses," Internet Engineering Task Force (IETF) Request for Comments (RFC) 3927, May 2005, 33 pages.

(Continued)

*Primary Examiner* — Charles C Jiang
*Assistant Examiner* — Will Lin
(74) *Attorney, Agent, or Firm* — Slater Matsil, LLP

(57) ABSTRACT

Embodiments are provided for a mechanism for supporting multiple 3GPP Packet Data Network (PDN) connections over a WLAN. Multiple gateway interfaces, each corresponding to a different PDN, are established over a single connection, via the WLAN, between a UE and an access gateway. A PDN access configuration protocol (PACP) is provided to configure the association between the IP interface on the access gateway and the corresponding 3GPP PDN/APN connection, and exchange the PDN setup between the UE and the access gateway. The PACP mechanisms allow signaling APN information and associating corresponding IP context at the access gateway, setting up and tearing down connection context between the UE and PDN gateway (P-GW), and supporting session continuity when the UE moves to another access gateway. The mechanisms support using Dynamic Host Configuration Protocol (DHCP) for IPv4 and Neighbor Discovery for IPv6.

31 Claims, 10 Drawing Sheets

(51) Int. Cl.
  *H04W 84/02*  (2009.01)
  *H04L 29/12*  (2006.01)

(56) References Cited

U.S. PATENT DOCUMENTS

| | | | |
|---|---|---|---|
| 2009/0287922 A1* | 11/2009 | Herwono | H04L 9/0822 713/155 |
| 2010/0027448 A1* | 2/2010 | Puthiyandyil | H04W 76/025 370/310 |
| 2010/0042714 A1* | 2/2010 | Choi | H04L 29/12301 709/223 |
| 2010/0228980 A1* | 9/2010 | Falk | H04L 63/062 713/171 |
| 2010/0291943 A1* | 11/2010 | Mihaly | H04L 29/12066 455/450 |
| 2011/0128913 A1* | 6/2011 | Chowdhury | H04L 63/0892 370/328 |
| 2012/0179790 A1* | 7/2012 | Kim | H04L 67/22 709/220 |
| 2013/0012182 A1* | 1/2013 | Liao | H04W 48/20 455/418 |
| 2013/0034057 A1* | 2/2013 | Aramoto | H04W 36/0011 370/328 |
| 2013/0097329 A1* | 4/2013 | Alex | H04L 61/2567 709/228 |
| 2013/0223421 A1* | 8/2013 | Gundavelli | H04W 76/022 370/338 |
| 2013/0343304 A1* | 12/2013 | Kaippallimalil | H04W 28/18 370/329 |
| 2014/0071969 A1* | 3/2014 | Roeland | H04W 76/026 370/338 |
| 2014/0086226 A1* | 3/2014 | Zhao | H04W 76/022 370/338 |
| 2014/0101726 A1* | 4/2014 | Gupta | H04N 21/2365 726/4 |
| 2014/0177446 A1* | 6/2014 | Sun | H04L 45/38 370/236 |
| 2014/0269551 A1* | 9/2014 | Henderickx | H04W 76/022 370/329 |

FOREIGN PATENT DOCUMENTS

| | | |
|---|---|---|
| CN | 101801102 A | 8/2010 |
| WO | 2009158703 A1 | 12/2009 |

OTHER PUBLICATIONS

3GPP, Technical Specification Group Services and System Aspects; General Packet Radio Service (GPRS) Enhancements for Evolved Universal Terrestrial Radio Access Network(E-UTRAN) access (Release 11), TS 23.401 V11.2.0, Jun. 2012, 285 pages.

3GPP Technical Specification Group Services and System Aspects; Architecture Enhancements for non-3GPP Accesses (Release 11), TS 23.402 V11.3.0, Jun. 2012, 252 pages.

Wi-Fi Alliance, Hotspot 2 (Release 2) Technical Specification, Version 1.03, Wi-Fi Alliance Technical Committee Hotspot 2.0 Technical Task Group, Jun. 2012, 137 pages.

International Search Report and Written Opinion received in International Application No. PCT/CN2013/083557 mailed Dec. 19, 2013, 11 pages.

Droms, R., "Dynamic Host Configuration Protocol," Internet Engineering Task Force (IETF) Request for Comments (RFC) 2131, Mar. 1997, 48 pages.

Narten, T., et al., Neighbor Discovery for IP version 6 (IPv6), Internet Engineering Task Force (IETF) Internet Engineering Task Force (IETF) RFC 4861, Sep. 2007, 97 pages.

Juniper Networks, "P-CR 23.852 v1.2.0 SaMOG Layer 3 Solution," S2-122736, SA WG2 Meeting #92, Barcelona, Spain, Jul. 9-13, 2012, 11 pages.

Huawei, Hisilicon, Intel, "SaMOG Phase 2—APN/PDN Signalling," 3GPP TSG SA WG2 Meeting #94, TD S2-124845, Revision of S2-124767, Nov. 12-16, 2012, New Orleans, USA, 12 pages.

Alcatel-Lucent, et al., "Introduction of eSaMOG; overall description," Change Request, Current Version 12.1.0, SA WG2 Meeting #99, S2-13xxxx, Sep. 23-27, 2013, Xiamen, China, 15 pages.

* cited by examiner

SYSTEM AND METHOD FOR A MULTIPLE IP INTERFACE CONTROL PROTOCOL

This application claims the benefit of U.S. Provisional Application No. 61/701,369 filed on Sep. 14, 2012 by John Kaippallimalil et al. and entitled "System and Method for a Multiple IP Interface Control Protocol," and U.S. Provisional Application No. 61/709,679 filed on Oct. 4, 2012 by John Kaippallimalil and entitled "System and Method for Multiple Interface Control Protocol Initialization," both of which are hereby incorporated herein by reference as if reproduced in their entirety.

TECHNICAL FIELD

The present invention relates to the field of wireless communications, and, in particular embodiments, to a system and method for a multiple Internet Protocol (IP) interface control protocol.

BACKGROUND

User access to 3GPP Enhanced Packet Core (EPC) is supported over networks, such as a wireless local access network (WLAN), using Dual Stack Mobile IP (DSMIP) or Internet Key Exchange/Internet Protocol Security (IKE/IPSec) to provide a "connection oriented" interface that corresponds to a 3GPP Packet Data Network (PDN). 3GPP Release 11 specifications 23.402 (chapter 16) describes how a user in a trusted WLAN can attach and obtain services from the operator's EPC network. However, in Release 11, only connections to a single PDN are supported over a WLAN. It is desirable to support more than one PDN connection over the WLAN, for instance to achieve some parity between 3GPP and WLAN access in terms of the connection service model.

SUMMARY OF THE INVENTION

In accordance with an embodiment, a method implemented by a network component for supporting Packet Data Network (PDN) connections over a wireless access network includes receiving, from a user equipment (UE), a request to create a session associated with a PDN connection. The request indicates an Access Point Name (APN). The method further includes assigning a gateway Internet Protocol (IP) interface on a link between the UE and the network component, sending, to the UE, an acknowledgement to create a session, the acknowledgement including the gateway IP interface. Further, a request for establishing the PDN connection is sent to PDN gateway, and a response including an assigned IP address for the session is then received from the receiving from the PDN gateway.

In accordance with another embodiment, a method implemented by a UE using a dedicated protocol for supporting PDN connections over a wireless access network includes sending, to an access gateway, a request to create a session associated with a PDN connection. The request indicates an APN. The UE then receives, from the access gateway, an acknowledgement to create a session including a gateway IP interface assigned by the access gateway on a link between the UE and the access gateway. The method further includes sending, to the access gateway, a Dynamic Host Configuration Protocol (DHCP) request for associating the gateway IP interface with the PDN connection, and receiving, from the access gateway, a DHCP acknowledgement including an assigned IP address forwarded by a PDN gateway to the access gateway.

In accordance with another embodiment, an access gateway supporting PDN connections over a wireless access network includes at least one processor and a non-transitory computer readable storage medium storing programming for execution by the at least one processor. The programming including instructions to receive, from a UE, a request to create a session associated with a PDN connection. The request indicates an APN. The programming further configure the access gateway to assign a gateway IP interface on a link between the UE and the access gateway, and send, to the UE, an acknowledgement to create a session, the acknowledgement including the gateway IP interface. The access gateway is further configured to send, to a PDN gateway, a request for establishing the PDN connection, and receive, from the PDN gateway, a response including an assigned IP address for the session.

In accordance with yet another embodiment, a UE supporting PDN connections over a wireless access network includes at least one processor and a non-transitory computer readable storage medium storing programming for execution by the at least one processor. The programming includes instructions to send, to an access gateway, a request to create a session associated with a PDN connection. The request indicating an APN. The programming includes further instructions to receive, from the access gateway, an acknowledgement to create a session including a gateway IP interface assigned by the access gateway on a link between the UE and the access gateway. The UE is also configured to send, to the access gateway, a DHCP request for associating the gateway IP interface with the PDN connection, and receive, from the access gateway, a DHCP acknowledgement including an assigned IP address forwarded by a PDN gateway to the access gateway.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for a mechanism for supporting multiple 3GPP PDN connections over a WLAN. The embodiments enable multiple IP connections over a WLAN to corresponding PDNs and/or Access Point Name (APNs) over a single layer Media Access Control (MAC) link. Multiple gateway interfaces, each corresponding to a different PDN, can be established over a single connection (via the WLAN) between a user equipment (UE) and an access gateway. A PDN access configuration protocol (PACP) is provided to configure the association between the IP interface on the access gateway and the corresponding 3GPP PDN/APN connection, and exchange the PDN setup between the UE and the access gateway. The PACP mechanisms allow signaling APN information and associating corresponding IP context at the access gateway, setting up and tearing down connection context between the UE and PDN gateway (P-GW), and supporting session continuity when the UE crosses to another access gateway. The mechanisms support using Dynamic Host Configuration Protocol (DHCP) for IP version 4 (IPv4) and Neighbor Discovery for IP version 6 (IPv6), and are compatible with 3GPP Release 11 specification 23.402 (chapter 16) methods for setting up a single connection.

Figure 1:
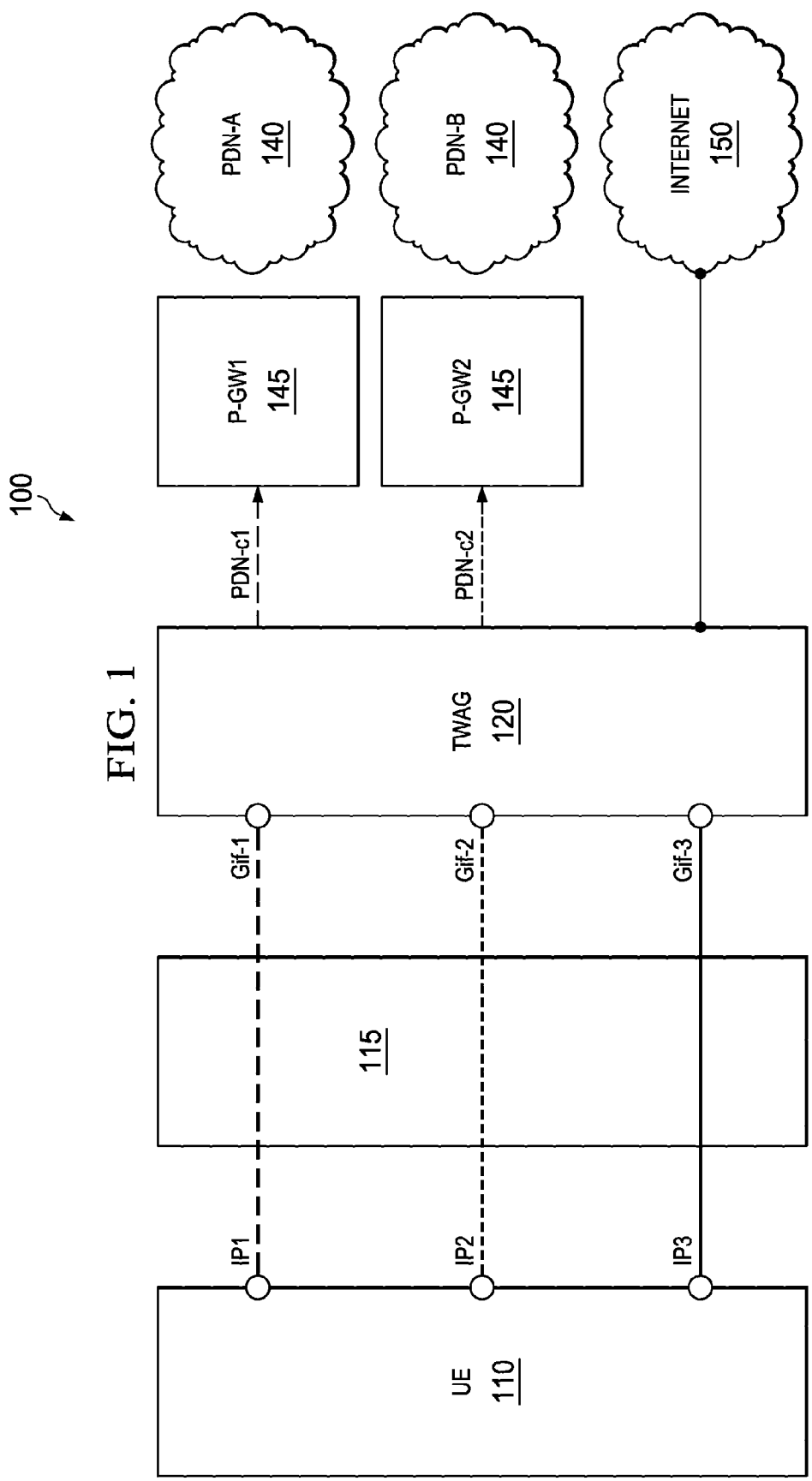
FIG. 1 illustrates a PDN connection model according to an embodiment of the disclosure.

FIG. 1 illustrates a PDN connection model 100 according to an embodiment of the disclosure. A UE 110 attaches to a P-GW 145 in a 3GPP EPC via a WLAN access point (AP) 115 and an access gateway 120, referred to as a trusted wireless access gateway (TWAG). The UE may be any user operated mobile or personal communications/computer device, such a sa desktop computer, a laptop computer, a tablet computer, a smartphone, or set-top box, or other devices. The access gateway 120 is the first hop router for the UE 110. The WLAN AP 115 connects the UE 110 to the access gateway 120. The access gateway 120 behaves as a Proxy Mobile IP (PMIP) mobile access gateway (MAG) and obtains IP addresses from the P-GW 145, which in turn serves as a PMIP local mobility anchor (LMA). The UE 100 can establish multiple connections, e.g., three connections, over a single link with the access gateway 120. The connections are established using a PACP, as described further below. The three connections over the link between the UE and the access gateway 120 are associated with PDN connections (PDN-c1 and PDN-c2) to PDNs 140 (PDN-A and PDN-B) via corresponding P-GWs 145 (P-GW1 and P-GW2), and with a non-seamless WLAN offload (NSWO) connection from the access gateway 120 to the Internet or any IP network 150. Each of the connections on the single link between the UE 110 and the access gateway 120 is identified at the access gateway 120 by a gateway IP interface labeled Gif-x (Gif-1, Gif-2, Gif-3). Each gateway IP interface is derived from a virtual but unique MAC address configured in the access gateway 120. The gateway IP interface is unique for all PDN/NSWO connections of the UE 110. A connection context is unique if the combination or tuple {host IP address for connection, host MAC address, gateway IP interface for connection, gateway MAC address for connection} is unique.

Figure 2:
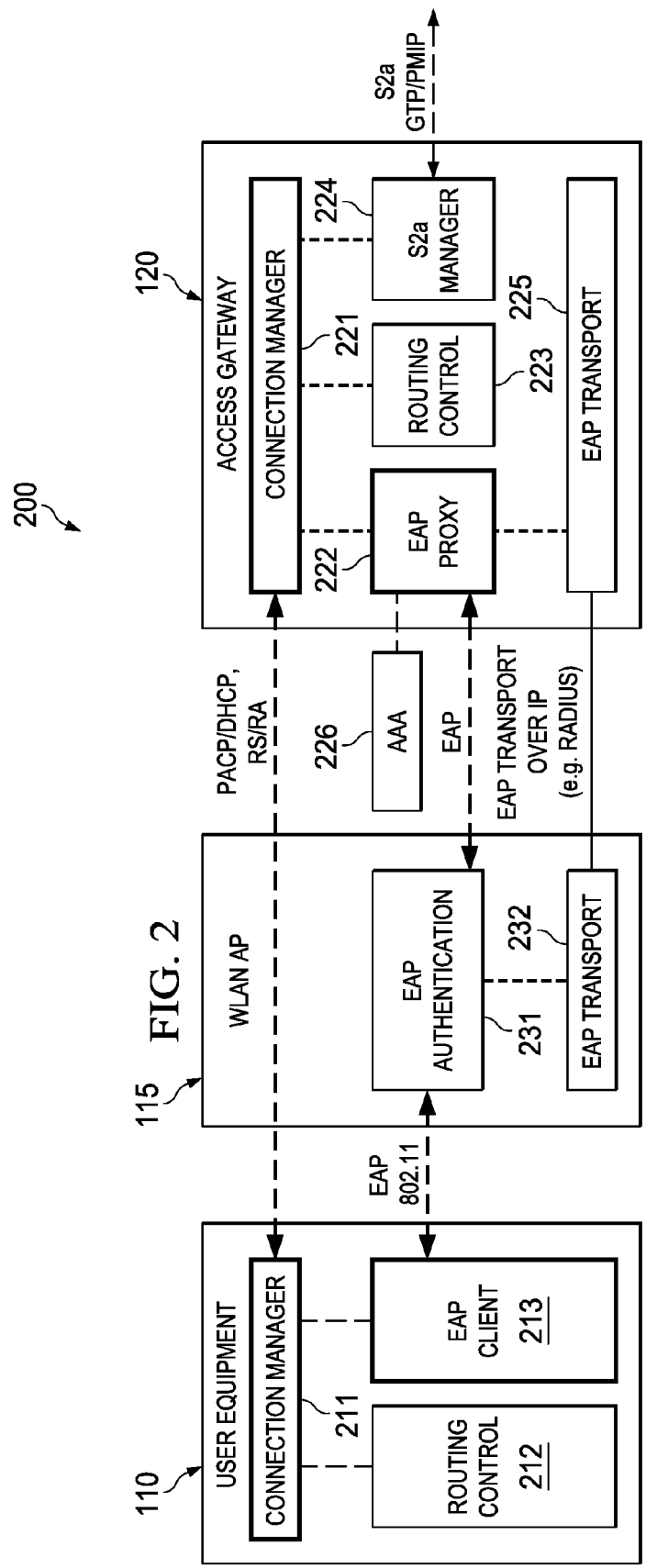
FIG. 2 illustrates a nodal model according to an embodiment of the disclosure.

FIG. 2 illustrates a nodal model 200 according to an embodiment of the disclosure. The model 200 describes various elements or entities of the UE 110, a WLAN AP 115, and the access gateway 120, which are used in the model 100 as described above. The UE 110 and the access gateway 120 support Release 11 3GPP PDN connections. The UE 110 includes a connection manager 211 that communicates, via the WLAN AP 115, with a second connection manager 221 at the access gateway 120 using the PACP to establish and delete PDN connections, as described below. The connection manager 211 and 221 can also communicate using DHCP and Router Advertisement (RA)/Router Solicitation (RS) messages. The connection manager 211 is also configured to associate the gateway interface received in a DHCP acknowledgement (Ack) or Router Advertisement to each connection and the associated applications. The connection manager 221 is configured to provide a gateway interface address and associate it with a corresponding PDN/APN.

The UE 110 supports a timer based on the DHCP retransmission values for PACP retransmission values. The access gateway 120 supports multiple MAC addresses that are mapped to a single interface. The number of MAC addresses supported may be equal to the maximum number of PDN connections per UE. The access gateway derives a gateway interface IP address from the MAC address. For IPv6, a 64 bit extended unique identifier (EUI-64) may be used. For IPv4, a simpler mapping of MAC address to one of the subnet addresses of the router may be used. The access gateway is capable of multiplexing the incoming IP configuration requests based on UE MAC address and gateway IPv4 address. For IPv6, the access gateway 120 also has the ability to generate a transient multicast address and listen to the multicast address for Router Solicitation. The source (UE and PDN) of the multicast request is determined using source IPv6 Link Local Address (LLA), or MAC, and multicast destination address.

The UE 110 also includes a routing control 212 and an Extensible Authentication Protocol (EAP) client 213 for authenticating the UE 110 by interacting with an EAP proxy 222 at the access gateway 120 via an EAP authentication entity 231 at the WLAN AP 115. The EAP client 213 supports extensions that configure a set of keys, of which one is used to generate a hash checksum of PACP messages and another is sent to the access gateway to verify the hash value/checksum. Similarly, the EAP proxy 222 supports extensions that configure a set of keys, of which one is used to generate a hash checksum of PACP messages, and another is sent to the UE to verify the hash value/checksum. The EAP authentication entity 231 and the EAP proxy 222 communicates with a corresponding local EAP transport entity 232 and 225, respectively, for EAP transport over IP, e.g., using a Remote Authentication Dial In User Service (RADIUS) protocol. The EAP proxy 222 also communicates with an Authentication, Authorization and Accounting (AAA) server or entity 226 to authenticate the UE 110. The access gateway 120 also includes a routing control entity 223 and a S2a manager for establishing General Packet Radio Service (GPRS) Tunneling Protocol (GTP)/PMIP tunnel to the P-GW in the 3GPP EPC.

In an embodiment, the PACP uses Internet Control Message Protocol (ICMP) Echo frames to carry the signal for establishing and configuring the PDN connections between the UE and the P-GWs, for deleting connections, and establishing session continuity as described below. The ICMP Echo protocol allows an arbitrary payload following the Echo message, which is used to transport the PACP frame. Since the recipient "echoes" this entire frame back, after extracting the payload, the ICMP Echo exchange provides a measure of reliability. In another embodiment, the PACP exchanges are implemented using 802.11 management frames, which provide reliable transport of management messages. The 802.11 management frames are used to transport the PACP frame to the AP. The PACP protocol can be backhauled from the AP as payload using RADIUS, Control and Provisioning of Wireless Access Points (CAPWAP), or a similar protocol.

The PACP massages include a protocol number, length indication, and a keyed hash checksum. The protocol number is a unique number that allows identification of the protocol, and the length indicates the length of the message. The protocol uses the hash keys exchanged between the UE and access gateway during the EAP-AKA authentication sequence. Both the UE and access gateway provide keys that can be used to check the hash code of messages. The messages include REQUEST, RESPONSE and NOTIFY messages, as described below. The protocol supports the following operations. A create session operation is used by the UE to request the access gateway to setup a PDN connection corresponding to the APN. In case of handover, the UE also provides the IP address used previously. In response, the access gateway provides the Gateway Interface/Router Interface to be used for the PDN gateway. This operation consists of a REQUEST/RESPONSE sequence. A delete session operation is used by the UE or the access gateway to indicate that it is tearing down the context associated with an indicated IP address/prefix. This operation uses a NOTIFY message. A session information operation is used by the access gateway to provide session information for any session that is setup by default, for example as per 3GPP Release 11 mechanisms. The parameters of each operation can be binary encoded for efficiency.

Figure 3:
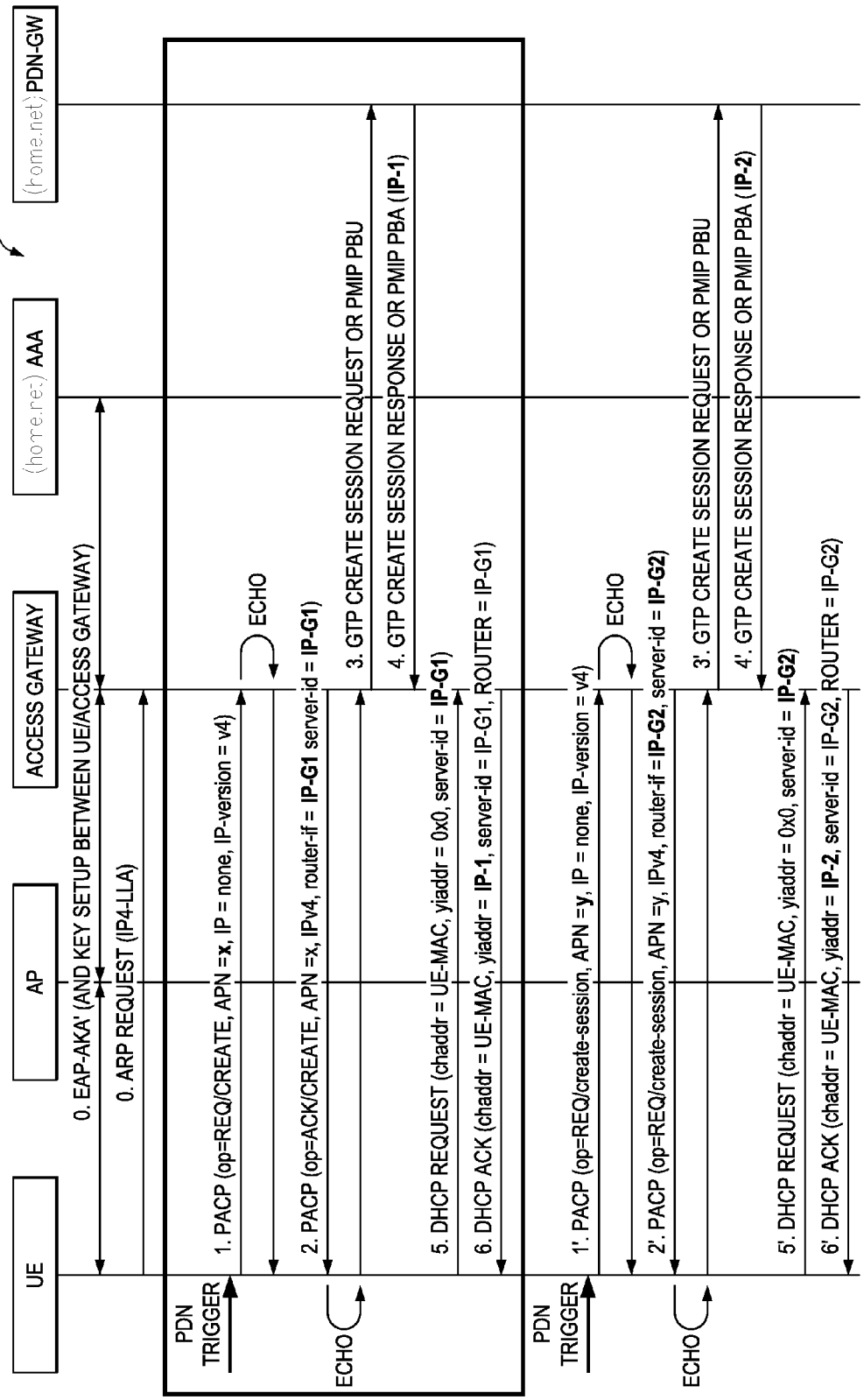
FIG. 3 illustrates an embodiment scheme for IPv4 interface configuration.

FIG. 3 illustrates an embodiment scheme 300 for IPv4 interface configuration using the PACP. The scheme 300 is used to establish a PDN connection between a UE and a P-GW and a corresponding or IPv4 connection or association between the UE and the access gateway. The connection setup sequence includes first authenticating the UE, using EAP and Authentication Key Agreement (AKA') and setting up keys to be used in the PACP control signaling. Following this, the UE obtains a link-local address and uses this interface to setup the PDN connection. At step 0, the UE authenticates to the network (using EAP-AKA') and exchanges a key, which are used later in checking hashed integrity values of the PACP messages from the UE and access gateway. Following authentication, the UE configures a link-local IPv4 address to use for signaling the PDN connection setup using ICMP Echo or other User Datagram Protocol (UDP) binary transport. To confirm that the address is unique, the UE sends an Address Resolution Protocol (ARP) probe message or request to the access gateway. At step 1, on trigger to set up a connection for APN-x, the UE sends a PACP request to create a connection context, using a PACP operation request/create message. The access gateway echoes the message back (according to ICMP Echo) after extracting the PACP payload, and also pipes the content of the message to a connection handler for processing.

At step 2, the connection handler in the access gateway processes the PACP create message and returns, using a PACP operation acknowledge/create message, a gateway IP interface for the connection that is unique to the UE. The value of the gateway IP interface is sent in a router interface/server identifier (ID) since both the DHCP server and access gateway is the same network node in this architecture. The UE echoes the ICMP Echo response back to the access gateway. At step 3, in parallel with sending the response in step 2, the access gateway looks up the PDN gateway address associated with the APN. This exchange may include a DNS request. The access gateway constructs a GTP Create Session request or a PMIP proxy binding update (PBU) message with the parameters the UE requested in the PACP create session message in step 1. At step 4, the PDN gateway (P-GW) creates the session and replies with GTP Create Session Response/PMIP proxy binding acknowledgement (PBA) and the IP address for the PDN connection. At step 5, the UE constructs a DHCP Request with server identity set to the value received in step 2. At step 6, the access gateway processes the DHCP Request and associates it with the APN received in step 1, e.g., APN-x, and returns the IP address configured for this PDN connection. The IP interface is now configured and ready for use. FIG. 3 also shows steps 1' to 6' for setting up similarly a second PDN connection for the UE.

The sequence above describes this connection setup using ICMP Echo for transporting PACP. Following the setup of the first PDN connection, the UE may deprecate the link local address. Any of the available IPv4 connections may be used for PACP signaling. If 802.11 management frames are used to transport PACP instead of ICMP Echo, setting up an IPv4 link local interface for the initial signaling is not necessary. In an alternative implementation, instead of a gateway IP address, a gateway MAC address may be configured to the UE in step 2. In this case, the DHCP Request is sent with multicast IP address, but with the unicast gateway MAC address configured for this PDN. The gateway associates this MAC address (and UE source MAC) to the APN/PDN.

Figure 4:
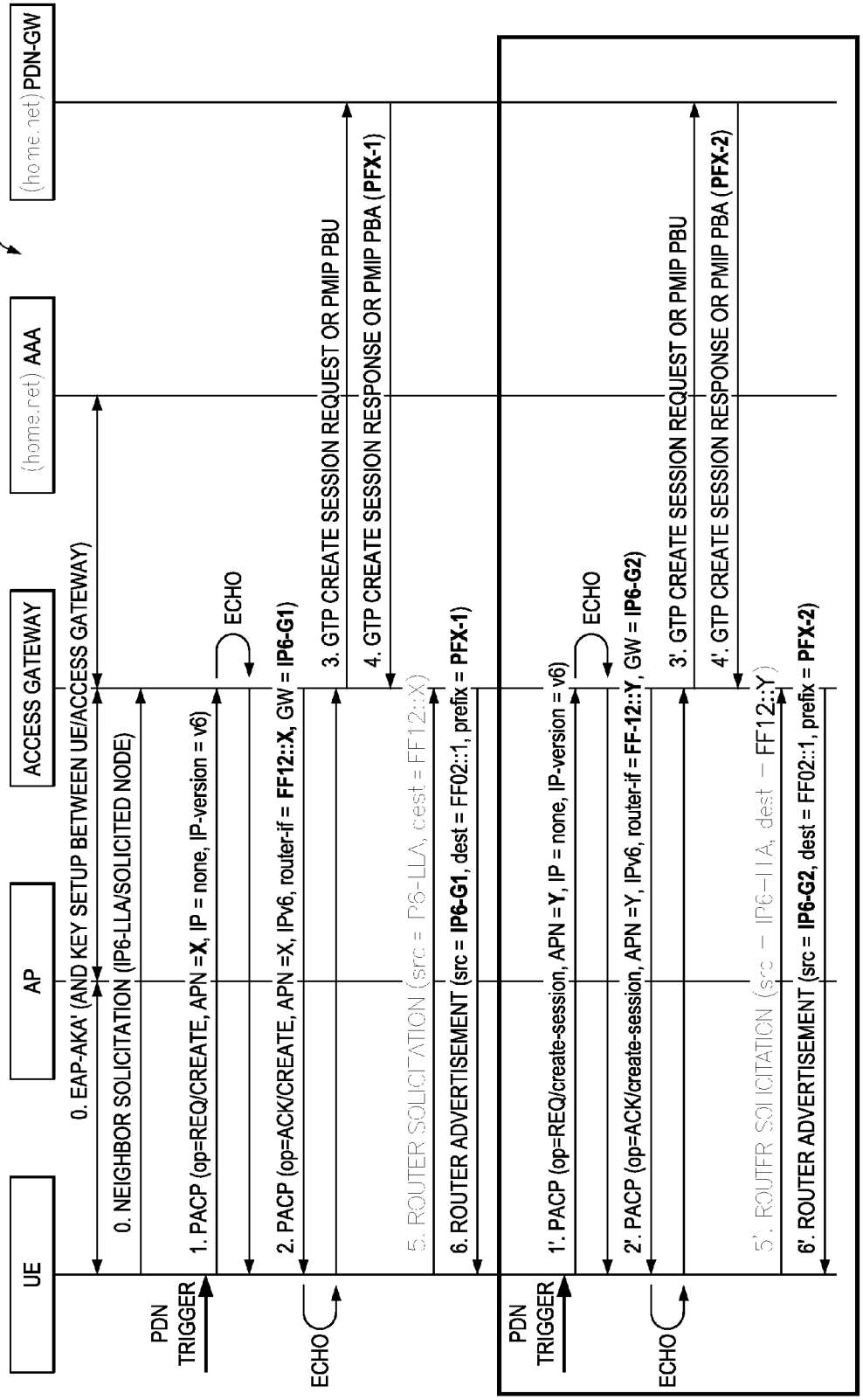
FIG. 4 illustrates an embodiment scheme for IPv6 interface configuration.

FIG. 4 illustrates an embodiment scheme 400 for IPv6 interface configuration using the PACP. The scheme 400 is used to establish a PDN connection between a UE and a P-GW and a corresponding IPv6 connection between the UE and the access gateway. The connection setup sequence is similar to the scheme 300 for IPv4. At step 0, the UE authenticates to the network (using EAP-AKA') and exchanges a key for use later in checking hashed integrity values of the PACP messages from UE and access gateway. Following authentication, the UE configures a link-local IPv6 address, e.g., using the process in Neighbor Discovery for IPv6. At step 1, on trigger to set up a connection for APN-x, the UE sends a PACP request to create a connection context, using a PACP operation request/create message. The access gateway echoes the message back, and pipes the content of the message to a connection handler for processing.

At step 2, the connection handler in the access gateway processes the PACP create message and returns, using a PACP operation acknowledge/create message, a router interface and IP Gateway interface for the connection that is unique to the UE. The router interface is a transient multicast address that the access gateway listens to. The UE echoes the ICMP Echo response back to the access gateway. At step 3, in parallel with sending the response in step 2, the access gateway looks up the PDN gateway (P-GW) address associated with the APN (this may include DNS request). The access gateway constructs a GTP Create Session request or a PMIP PBU message with the parameters the UE requested in the PACP create-session. At step 4, the PDN gateway creates the session and replies with GTP Create Session Response/PMIP PBA and the IPv6 prefix for the PDN connection. At step 5, the UE may optionally constructs a Router Solicitation with destination address set to the value received of router interface in step 2. At step 6, the access gateway sends a Router Advertisement with IPv6 prefix for the PDN connection obtained in step 4, and a source address set to the gateway address value sent in step 2. The IPv6 interface is now configured and ready for use. FIG. 4 also shows steps 1' to 6' for setting up similarly a second PDN connection for the UE.

The sequence above describes this connection setup using ICMP Echo for transporting PACP. Alternatively, 802.11 management frames can be used. In this case, using the IPv6 link local interface for the PACP signaling is not necessary. In another implementation, instead of a transient multicast address, a gateway MAC address can be configured to the UE in step 2. In this case, if the Router Solicitation is sent, the destination address can be the All-routers-multicast address, but the destination Layer 2 address is the unicast gateway MAC address configured for this PDN. The gateway associates this MAC address (and UE source LLA/MAC) to the APN/PDN.

Figure 5:
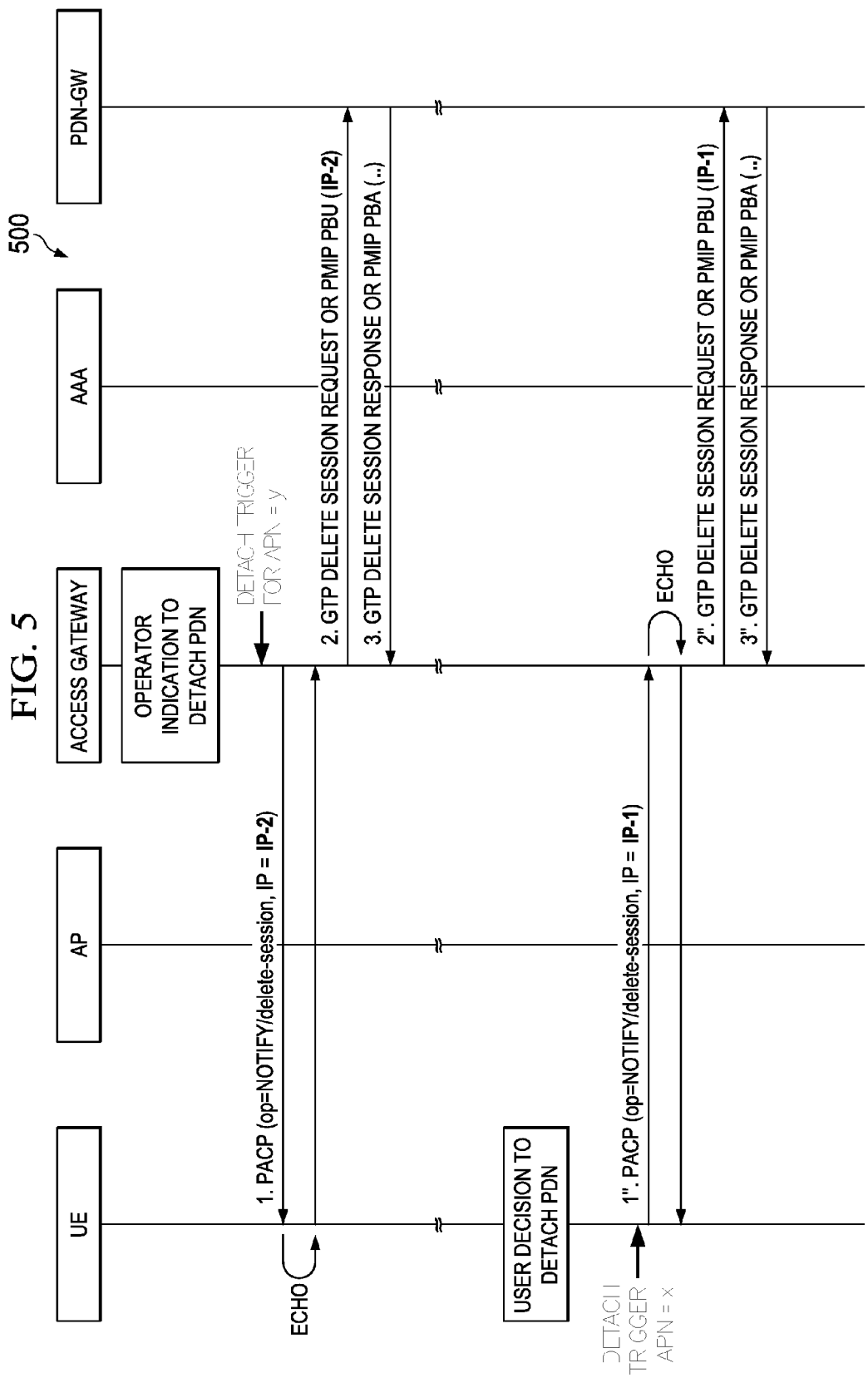
FIG. 5 illustrates an embodiment scheme for a graceful detach.

FIG. 5 illustrates an embodiment scheme 500 for a graceful detach of a UE's PDN connection using PACP. The scheme 500 outlines a general sequence for deleting a connection. Since there may be more than one connection active on an access link to the UE, deletion of a connection does not necessarily mean detachment of the link between the UE and the access gateway. Two connection deletion operations are supported: a network initiated connection release and a user initiated connection release. For the network initiated connection release, the trigger to detach an APN/PDN connection comes from the network, e.g., based on operator decision. The access gateway notifies the UE using a PACP notify/delete session, in step 1. This includes sending to the UE a PACP operation notify/delete session. When the UE receives the message, it echoes the message back and cleans up the local connection resources. The access gateway then signals the PDN-GW (P-GW) to release the connection resources in step 2, and receives a response in return in step 3.

For the user initiated connection release, the trigger to detach an APN/PDN connection is from the UE, e.g., when an application on the UE is closed. The UE notifies the access gateway using PACP notify/delete-session in step 1. This includes sending to the access gateway a PACP operation notify/delete session. When the access gateway receives the message, it echoes it back. The access gateway then signals the PDN-GW (P-GW) to release the connection resources in step 2, and receives a response in return in step 3. The access gateway also releases its own connection resources. The UE may release its local connection resources on receipt of the echoed message in step 1.

Figure 6:
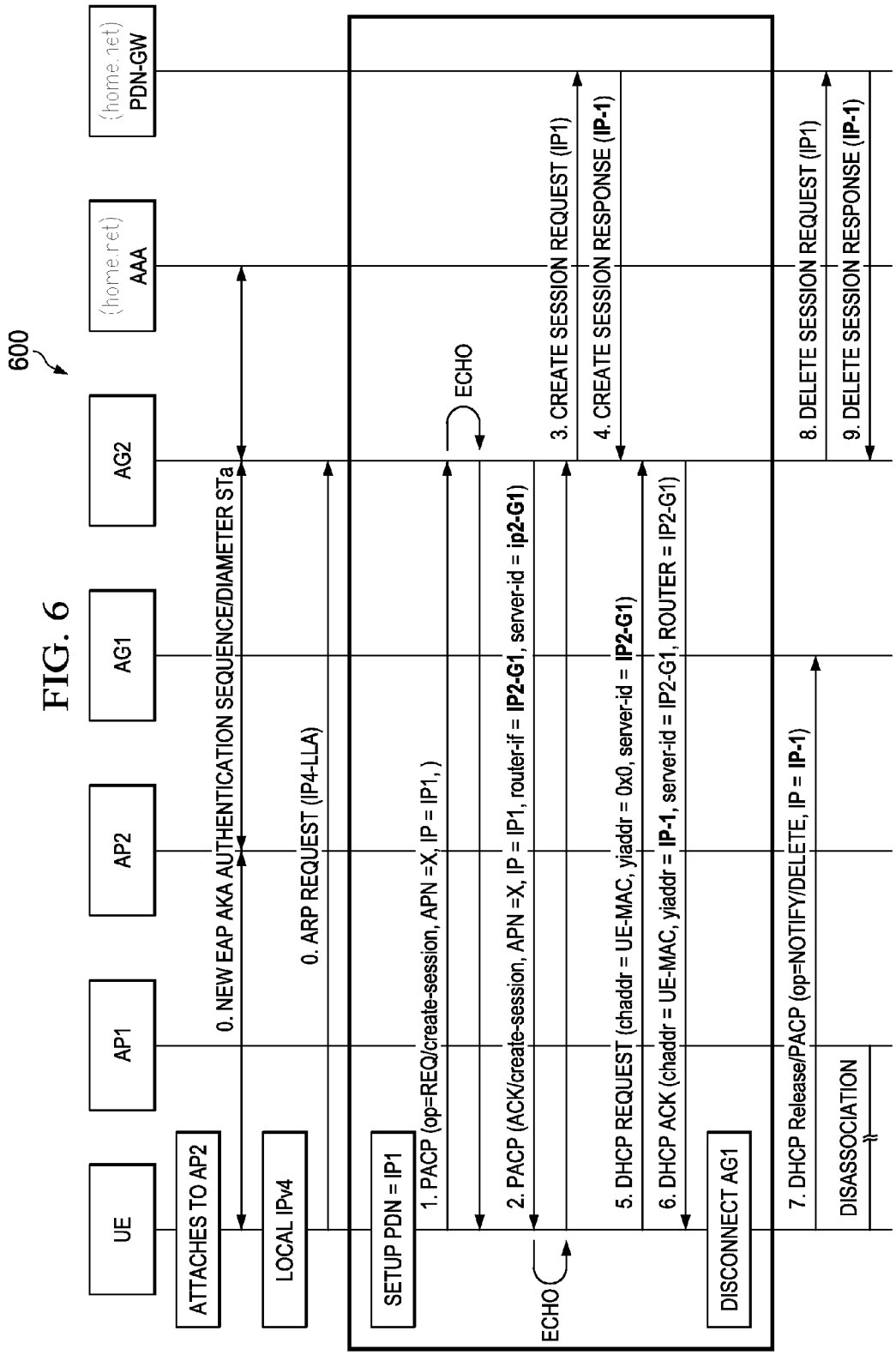
FIG. 6 illustrates an embodiment scheme for IPv4 handover.

FIG. 6 illustrates an embodiment scheme 600 for IPv4 handover using PACP, which ensures UE session continuity. This scheme 600 supports session continuity between multiple APs connected to the same access gateway and cases where the access gateway are changed. For instance, when the UE moves to a new AP, it may discover that the same access gateway is used due to Layer 2 signaling, authentication, and/or by sending an ARP Requests to the gateway. When the access gateway is new, the UE needs to perform authentication before attaching. The UE may request for the same IP address/prefix that was used previously using the PACP signaling.

Step 0 in the sequence for session continuity with IPv4 address is similar to initial establishment of connections in scheme 300, including EAP-AKA and local-link establishment, followed by signaling to setup the PDN connection. In step 1 of scheme 600, in the PACP request to create session, an IP address (labeled IP1) corresponding to the previously assigned IP address is sent from the UE to the new access gateway, AG2. In step 2, the new access gateway, AG2, replies to the UE with a new router/server identity, and in steps 3 and 4 sends a request to the PDN-GW to allocate address IP1 for the PDN connection. The rest of the connection sequence, in steps 5 and 6, is the similar to initial attachment in scheme 300. Following setting up the PDN connection, the UE may delete the old connection using DHCP Release or PACP delete operations, in step 7, similar to scheme 500. The old access gateway, AG1, cleans up the connections and releases the PDN in steps 8 and 9, e.g., if the UE is a single radio host that breaks the old connections without a proper detach.

Figure 7:
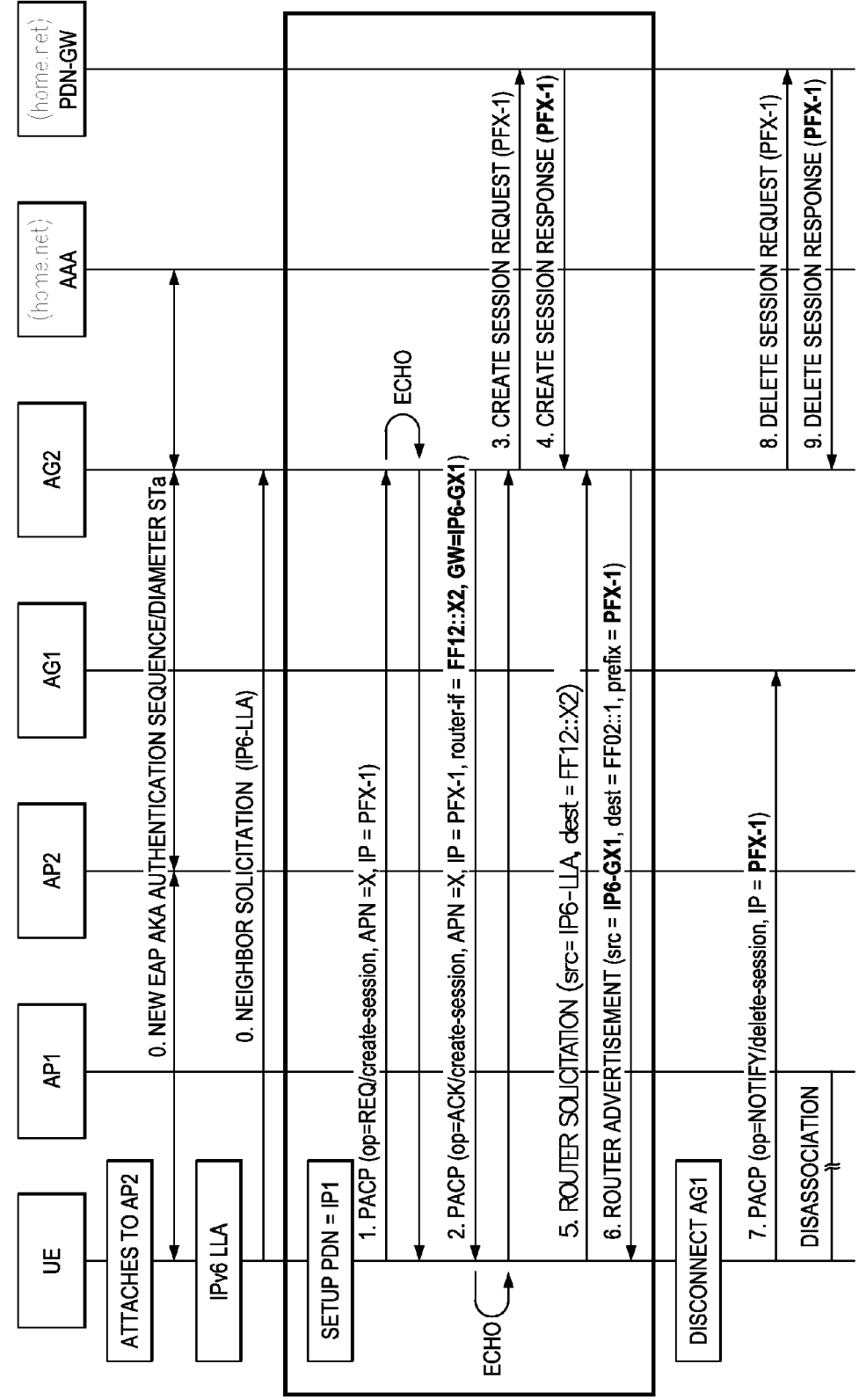
FIG. 7 illustrates an embodiment scheme for IPv6 handover.

FIG. 7 illustrates an embodiment scheme 700 for IPv6 handover, which ensures UE session continuity. Step 0 in the sequence for session continuity with IPv6 prefix is similar to initial establishment of connections in scheme 400, including EAP-AKA and local-link establishment, followed by signaling to setup the PDN connection. In step 1, in the PACP request to create-session, an IPv6 prefix (labeled PFX-1) corresponding to the previously assigned IPv6 prefix is sent from the UE to the new access gateway, AG2. In step 2, the new access gateway, AG2, replies to the UE with a new router/server identity, and in steps 3 and 4 sends a request to the PDN-GW to allocate address PFX-1 for the PDN connection. The rest of the connection sequence, in steps 5 and 6, is similar to initial attachment in scheme 400. Following setting up the PDN connection, the UE may delete the old connections using PACP delete operations, in step 7, similar to scheme 500. Unlike DHCP/IPv4, IPv6 stateless configuration does not have an explicit release message with the semantics to realize immediate connection release. The old access gateway, AG1, cleans up the connections and releases the PDN in steps 8 and 9, e.g., if the UE is a single radio host that breaks the old connections without a proper detach.

Figure 8:
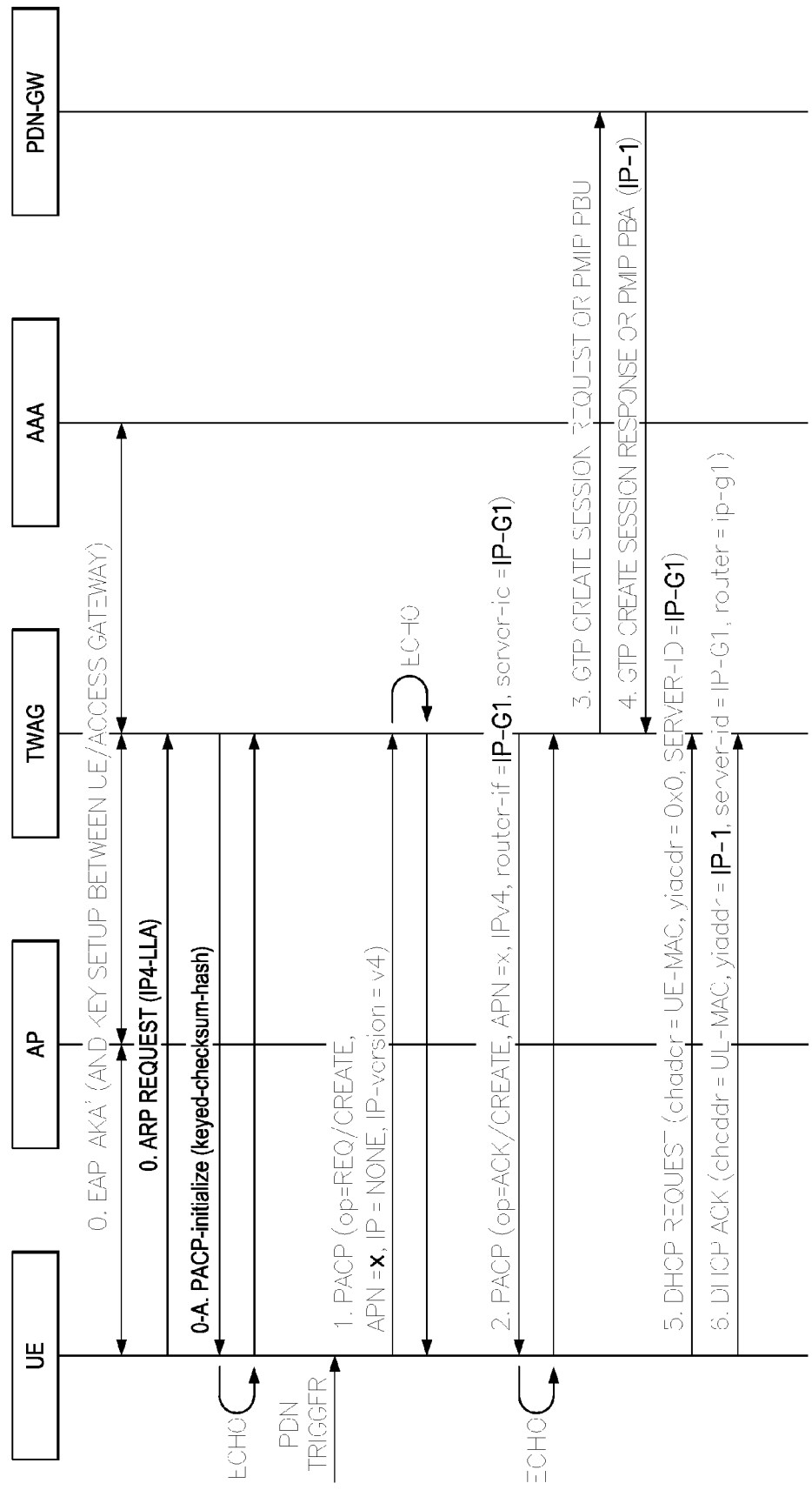
FIG. 8 illustrates another embodiment scheme for IPv4 interface configuration.

FIG. 8 illustrates another embodiment scheme 800 for IPv4 interface configuration. The scheme 800 is similar to the scheme 300. However, in the scheme 800, the UE further sets up a link local address after it has successfully authenticated with the network. At that point the access gateway (e.g., TWAG) sends to the UE a message from the router or gateway interface address to which subsequent PACP messages can be sent. When the access gateway receives (in step 0) an ARP Request or Neighbor Solicitation message with IPv4 LLA from the UE, the access gateway replies (in step 0-A) with a PACP-Initialize message. The PACP-Initialize message includes source IPv4 address and a MAC address corresponding to the gateway interface to which subsequent PACP for configuring multiple interfaces should be sent. The UE uses the source address in the PACP-Initialize as the access gateway/destination address of requests that it sends.

Figure 9:
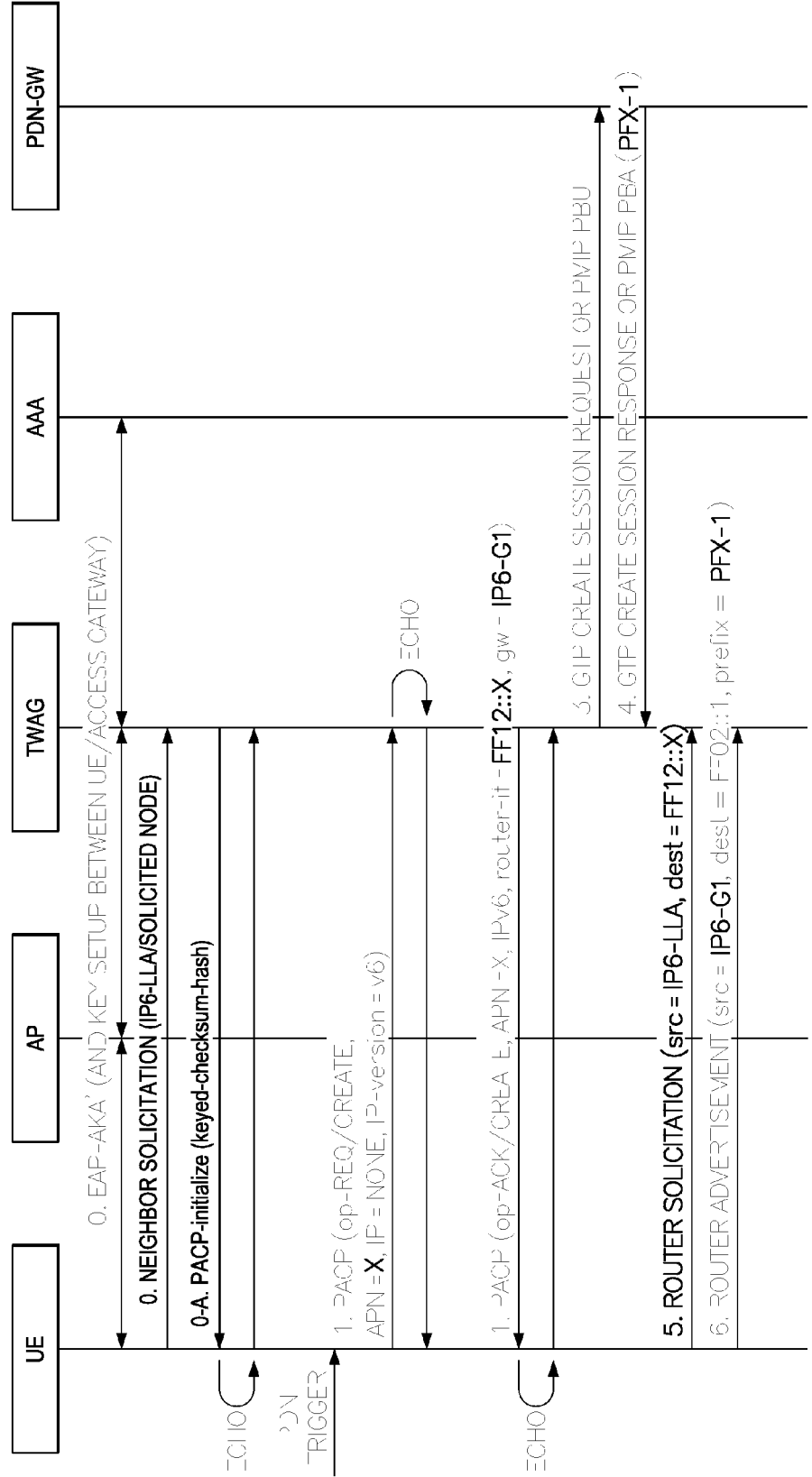
FIG. 9 illustrates another embodiment scheme for IPv6 interface configuration.

FIG. 9 illustrates another embodiment scheme 900 for IPv6 interface configuration. The scheme 900 is similar to the scheme 400. However, in the scheme 900, the UE further sets up a link local address after it has successfully authenticated with the network. At that point the access gateway (e.g., TWAG) sends to the UE a message from the router or gateway interface address to which subsequent PACP messages can be sent. When the access gateway receives (in step 0) a Neighbor Solicitation message with IPv6 LLA from the UE, the access gateway replies (in step 0-A) with a PACP-Initialize message. The PACP-Initialize message includes source IPv6 address and a MAC address corresponding to the gateway interface to which subsequent PACP for configuring multiple interfaces should be sent. The UE uses the source address in the PACP-Initialize as the access gateway/destination address of requests that it sends.

Figure 10:
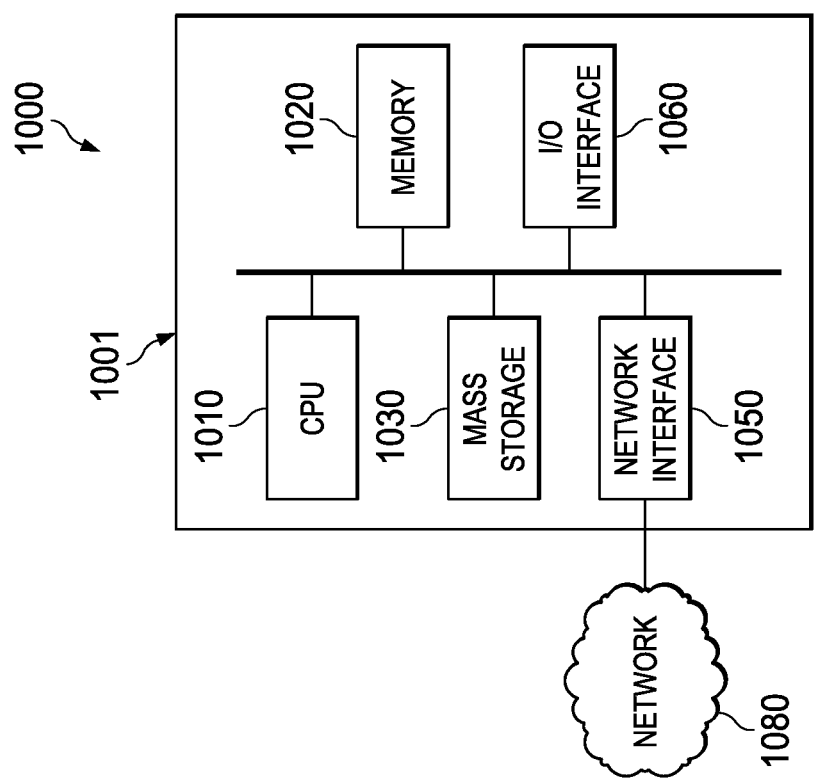
FIG. 10 is a diagram of an exemplary processing system that can be used to implement various embodiments.

FIG. 10 is a block diagram of an exemplary processing system 1000 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as a network interfaces, storage interfaces, and the like. The processing unit 1001 may include a central processing unit (CPU) 1010, a memory 1020, a mass storage device 1030, and an I/O interface 1060 connected to a bus. The bus may be one or more of any type of several bus architectures including a memory bus or memory controller, a peripheral bus or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method, implemented by a network component using a dedicated protocol for supporting Packet Data Network (PDN) connections over a wireless access network, the method comprising:

receiving, from a user equipment (UE), a request piggybacked on an internet control message protocol (ICMP) Echo message, the request requesting establishment of a PDN connection between the network component and a PDN, and creation of a session associated with the PDN connection, the request indicating an Access Point Name (APN);

assigning a gateway Internet Protocol (IP) interface on a link between the UE and the network component;

sending, to the UE, an acknowledgement to create a session, the acknowledgement including the gateway IP interface;

sending, to a PDN gateway, a request for establishing the PDN connection;

receiving, from the PDN gateway, a response establishing the session between the PDN gateway and the network component including an assigned IP address for the session;

receiving from the UE a dynamic host configuration protocol (DHCP) request using a value of the gateway IP interface as a server identity for an IP address associated with the session between the PDN gateway and the network component associated with the APN;

sending, to the UE, the assigned IP address; and establishing communication between the UE and the PDN gateway using the gateway IP interface and the assigned IP address for the session.

2. The method of claim 1, further comprising:

receiving, from the UE, an authentication message in accordance with an Extensible Authentication Protocol (EAP), the authentication message configuring a set of keys between the UE and the network component; and exchanging with the UE a hash checksum according to a key of the set of keys.

3. The method of claim 2, further comprising:

receiving, from the UE, an Address Resolution Protocol (ARP) probe request indicating an IP version 4 (IPv4) address generated by the UE for the session; and sending, to the UE, an initialize message including a source IPv4 address and a Media Access Control (MAC) address corresponding to the gateway IP interface.

4. The method of claim 2, further comprising:
receiving, from the UE, a Neighbor Solicitation message indicating an IP version 6 (IPv6) address generated by the UE for the session; and
sending, to the UE, an initialize message including a source IPv6 address and a Media Access Control (MAC) address corresponding to the gateway IP interface.

5. The method of claim 1, wherein the acknowledgement to create a session is transported as a payload in an Internet Control Message Protocol (ICMP) Echo message, and wherein the method further comprises:
receiving back, from the UE, an echo message for the acknowledgement to create a session.

6. The method of claim 1, wherein the request to create a session associated with a PDN connection and the acknowledgement to create a session are transported in IEEE 802.11 standard management frames.

7. The method of claim 1, wherein the request for establishing the PDN connection is a General Packet Radio Service (GPRS) Tunneling Protocol (GTP) Create Session request or a Proxy Mobile IP (PMIP) proxy binding update (PBU) message, and wherein the response is a GTP Create Session Response or a PMIP proxy binding acknowledgement (PBA).

8. The method of claim 1 further comprising:
receiving, from the UE, a second request to create a second session associated with a second PDN connection, the second request indicating a second Access Point Name (APN);
assigning a second gateway IP interface between the UE and the network component;
sending, to the UE, an acknowledgement to create the second session, the acknowledgement including the second gateway IP interface;
sending, to a second PDN gateway, a create session request for the second PDN connection; and
receiving, from the second PDN gateway, a create session response establishing the second session between the PDN gateway and the network component including a second assigned IP address for the second session;
receiving from the UE a dynamic host configuration protocol (DHCP) second request using a value of the second gateway IP interface as a server identity for an IP address associated with the second session between the second PDN gateway and the network component associated with the second APN;
sending, to the UE, the second assigned IP address; and
establishing communication between the UE and PDN gateway using the second gateway IP interface and the second assigned IP address for the second session.

9. The method of claim 1 further comprising:
detecting a trigger to detach the PDN connection for the APN;
sending, to the UE, a notify message to delete the session associated with the PDN connection, the notify message including the assigned IP address;
sending, to the PDN gateway, a request to delete the PDN connection, the request indicating the assigned IP address; and
receiving, form the PDN gateway, a response to delete the PDN connection.

10. The method of claim 9, wherein the notify message to delete the session associated with the PDN connection is transported as payload in an Internet Control Message Protocol (ICMP) Echo message, and wherein the method further comprises receiving back, from the UE, the notify message.

11. The method of claim 9, wherein the notify message to delete the session associated with the PDN connection is transported in an IEEE 802.11 standard management frame.

12. The method of claim 9, wherein the request to delete the PDN connection is a General Packet Radio Service (GPRS) Tunneling Protocol (GTP) Delete Session request or a Proxy Mobile IP (PMIP) proxy binding update (PBU) message, and wherein the response is a GTP Delete Session Response or a PMIP proxy binding acknowledgement (PBA).

13. The method of claim 1 further comprising:
receiving, from the UE, a notify message to delete the session associated with the PDN connection, the notify message including the assigned IP address;
sending, to the PDN gateway, a request to delete the PDN connection, the request indicating the assigned IP address; and
receiving, form the PDN gateway, a response to delete the PDN connection.

14. The method of claim 1, wherein the network component is an access gateway to a PDN, and wherein the link connects the UE to the access gateway via a wireless network access point (AP).

15. The method of claim 14 further comprising:
receiving, from a second UE previously connected to a second access gateway, a request to create a new session associated with a second PDN connection between the second access gateway and the PDN gateway, the request indicating a second APN;
assigning a second gateway IP interface on a link between the second UE and the network component;
sending, to the second UE, an acknowledgement to create a new session, the acknowledgement including the second gateway IP interface;
sending, to a PDN gateway, a request for establishing the second PDN connection;
receiving, from the PDN gateway, a response establishing the new session between the PDN gateway and the network component including a second assigned IP address for the new session;
receiving, from the second UE, a Dynamic Host Configuration Protocol (DHCP) request using a value of the second gateway IP interface as a server identity for an IP address associated with the new session between the PDN gateway and the network component associated with the second APN;
sending, to the second UE, a DHCP acknowledgement including the second assigned IP address; and
establishing communication between the second UE and PDN gateway using the second gateway IP interface and the second assigned IP address for the new session.

16. A method, implemented by a user equipment (UE) using a dedicated protocol for supporting Packet Data Network (PDN) connections over a wireless access network, the method comprising:
sending, to an access gateway, a request piggybacked on an internet control message protocol (ICMP) Echo message, the request requesting establishment of a PDN connection between the access gateway and a PDN, and creation of a session associated with the PDN connection, the request indicating an Access Point Name (APN);

receiving, from the access gateway, an acknowledgement to create a session including a gateway Internet Protocol (IP) interface assigned by the access gateway between the UE and the access gateway;

sending, to the access gateway, a Dynamic Host Configuration Protocol (DHCP) request using a value of the gateway IP interface as a server identity for an IP address associated with the session between the access gateway and the PDN associated with the APN;

receiving, from the access gateway, a DHCP acknowledgement including an assigned IP address forwarded by a PDN gateway to the access gateway; and establishing communication between the UE and the PDN using the gateway IP interface and the assigned IP address for the session.

17. The method of claim 16, further comprising:

sending, to the access gateway, an authentication message in accordance with an Extensible Authentication Protocol (EAP), the authentication message configuring a set of keys between the UE and the access gateway; and exchanging with the access gateway a hash checksum according to a key of the set of keys.

18. The method of claim 17, further comprising:

sending, to the access gateway, an Address Resolution Protocol (ARP) probe request indicating an IP version 4 (IPv4) address generated by the UE for the session; and receiving, from the access gateway, an initialize message including a source IPv4 address and a Media Access Control (MAC) address corresponding to the gateway IP interface.

19. The method of claim 17, further comprising:

sending, to the access gateway, a Neighbor Solicitation message indicating an IP version 6 (IPv6) address generated by the UE for the session; and receiving, from the access gateway, an initialize message including a source IPv6 address and a Media Access Control (MAC) address corresponding to the gateway IP interface.

20. The method of claim 16 further comprising:

sending, to the access gateway, a second request to create a second session associated with a second PDN, the second request indicating a second Access Point Name (APN);

receiving, from the access gateway, an acknowledgement to create the second session, the acknowledgement including a second gateway IP interface assigned by the access gateway;

sending, to the access gateway, a Dynamic Host Configuration Protocol (DHCP) request using a value of the second gateway IP interface as a server identity for an IP address associated with the second session between the access gateway and the second PDN associated with the second APN;

receiving, from the access gateway, a DHCP acknowledgement including a second assigned IP address forwarded by the PDN gateway or a second PDN gateway to the access gateway; and establishing communication between the UE and the second PDN using the second gateway IP interface and the IP address for the second session.

21. The method of claim 16 further comprising:

detecting a trigger to detach the PDN connection for the APN;

sending, to the access gateway, a notify message to delete the session associated with the PDN connection, the notify message including the assigned IP address; and releasing the session with the access gateway.

22. The method of claim 16 further comprising:

receiving, from the access gateway, a notify message to delete the session associated with the PDN connection, the notify message including the assigned IP address; and releasing the session with the access gateway.

23. The method of claim 16 further comprising:

upon moving to a second access gateway, sending from the UE to the second access gateway a request to create a new session associated with the same PDN connection, the request indicating the APN;

receiving, from the second access gateway, an acknowledgement to create a new session including a second gateway IP interface assigned by the second access gateway on a second link between the UE and the second access gateway;

sending, to the second access gateway, a Dynamic Host Configuration Protocol (DHCP) request using a value of the second gateway IP interface as a server identity for an IP address associated with the session between the second access gateway and the PDN associated with the APN;

receiving, from the second access gateway, a DHCP acknowledgement including the assigned IP address forwarded by the PDN gateway to the second access gateway; and establishing communication between the UE and the PDN via the second access gateway using the second gateway IP interface and the IP address for the new session.

24. The method of claim 23 further comprising:

sending, to the access gateway, a DHCP release or a notify message to delete the session associated with the PDN connection; and releasing the session with the access gateway.

25. An access gateway supporting Packet Data Network (PDN) connections over a wireless access network, the access gateway comprising:

at least one processor; and a non-transitory computer readable storage medium storing programming for execution by the at least one processor, the programming including instructions to:

receive, from a user equipment (UE), a request piggybacked on an internet control message protocol (ICMP) Echo message, the request requesting establishment of a PDN connection between the access gateway and a PDN, and creation of a session associated with the PDN connection, the request indicating an Access Point Name (APN);

assign a gateway Internet Protocol (IP) interface on a link between the UE and the access gateway;

send, to the UE, an acknowledgement to create a session, the acknowledgement including the gateway IP interface;

send, to a PDN gateway, a request for establishing the PDN connection;

receive, from the PDN gateway, a response including an assigned IP address for the session;

receive, form the UE, a Dynamic Host Configuration Protocol (DHCP) request for associating the gateway IP interface with the PDN connection; and send, to the UE, a DHCP acknowledgement including the assigned IP address.

26. The access gateway of claim 25, wherein the programming includes further instructions to:
- receive, from the UE, an authentication message in accordance with an Extensible Authentication Protocol (EAP), the authentication message configuring a set of keys between the UE and the access gateway; and
- exchange with the UE a hash checksum according to a key of the set of keys.

27. The access gateway of claim 25, wherein the programming includes further instructions to:
- send to or receive from the UE a notify message to delete the session associated with the PDN connection, the notify message including the assigned IP address;
- send, to the PDN gateway, a request to delete the PDN connection, the request indicating the assigned IP address; and
- receive, from the PDN gateway, a response to delete the PDN connection.

28. The access gateway of claim 25, wherein the link connects the access gateway to the UE via a wireless local access network (WLAN) access point (AP).

29. A user equipment (UE) supporting Packet Data Network (PDN) connections over a wireless access network, the UE comprising:
- at least one processor; and
- a non-transitory computer readable storage medium storing programming for execution by the at least one processor, the programming including instructions to:
  - send, to an access gateway, a request piggybacked on an internet control message protocol (ICMP) Echo message, the request requesting establishment of a PDN connection between the access gateway and a PDN, and creation of a session associated with the PDN connection, the request indicating an Access Point Name (APN);
  - receive, from the access gateway, an acknowledgement to create a session including a gateway Internet Protocol (IP) interface assigned by the access gateway on a link between the UE and the access gateway;
  - send, to the access gateway, a Dynamic Host Configuration Protocol (DHCP) request using a value of the gateway IP interface as a server identity for an IP address associated with the session between the access gateway and the PDN associated with the APN;
  - receive, from the access gateway, a DHCP acknowledgement including an assigned IP address forwarded by a PDN gateway to the access gateway; and
  - establish communication between the UE and the PDN using the gateway IP interface and the assigned IP address for the session.

30. The UE of claim 29, wherein the programming includes further instructions to:
- send, to the access gateway, an authentication message in accordance with an Extensible Authentication Protocol (EAP), the authentication message configuring a set of keys between the UE and the access gateway; and
- exchange with the access gateway a hash checksum according to a key of the set of keys.

31. The UE of claim 29, wherein the programming includes further instructions to:
- send to or receiving from the access gateway a notify message to delete the session associated with the PDN connection, the notify message including the assigned IP address; and
- release the session on the link with the access gateway.

* * * * *